Figure 1:
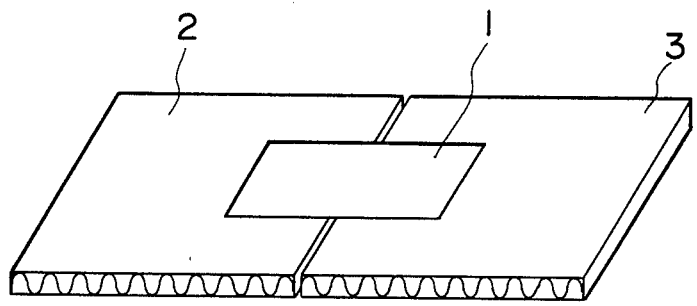

United States Patent [19]

Suda et al.

[11] 4,359,551

[45] Nov. 16, 1982

[54] HOT-MELT PRESSURE-SENSITIVE ADHESIVE COMPOSITION CONTAINING AN ACID GRAFTED BLOCK COPOLYMER

[75] Inventors: Yoshikazu Suda, Tokyo; Haruhisa Nagano, Kawasaki; Shigeyuki Miyata, Yokohama; Akio Yamori, Kawasaki, all of Japan

[73] Assignee: Asahi Kasei Kogyo Kabushiki Kaisha, Osaka, Japan

[21] Appl. No.: 217,984

[22] Filed: Dec. 18, 1980

[30] Foreign Application Priority Data

Dec. 26, 1979 [JP] Japan .................. 54-168206

[51] Int. Cl.³ .................. C08L 53/02; C08L 51/00
[52] U.S. Cl. .................. 524/271; 525/78; 525/71; 525/74; 524/504; 524/145; 524/314
[58] Field of Search .............. 525/74, 78; 260/27 BB

[56] References Cited

FOREIGN PATENT DOCUMENTS 50-56427 5/1975 Japan .
55-102668 8/1981 Japan .

*Primary Examiner*—Carman J. Seccuro
*Attorney, Agent, or Firm*—Armstrong, Nikaido, Marmelstein & Kubovcik

[57] ABSTRACT

A hot-melt pressure-sensitive adhesive composition comprising (a) 100 parts by weight of a specific grafted block copolymer material formed by the graft reaction of at least one block copolymer comprising at least one polybutadiene or polyisoprene block and at least two polystyrene blocks with at least one unsaturated carboxylic acid monomer and/or derivative monomer thereof and (b) 50 to 250 parts by weight of a specific tackifier mixture consisting of a tackifier S comprising at least 50% by weight of a terpene resin having a softening point of 60° C. or more and a tackifier L comprising at least 50% by weight of a terpene resin having a softening point of 30° C. or less and having an S/L mixing weight ratio of 9/1 to 3/7, and optionally 1 to 50 parts by weight of a softening agent has been found to be excellent in holding power especially for paper.

15 Claims, 3 Drawing Figures

HOT-MELT PRESSURE-SENSITIVE ADHESIVE COMPOSITION CONTAINING AN ACID GRAFTED BLOCK COPOLYMER

The present invention relates to a hot-melt pressure-sensitive adhesive composition. More particularly, the invention relates to a hot-melt pressure-sensitive adhesive composition which comprises as the base polymer a modified block copolymer comprising at least one polybutadiene or polyisoprene block and at least two polystyrene blocks and grafted with at least one unsaturated carboxylic acid monomer and/or derivative monomer thereof, and which is improved in holding power especially for paper and the like.

Pressure-sensitive adhesive compositions have heretofore been widely used for the manufacture of various pressure-sensitive adhesive products such as pressure-sensitive adhesive tapes and pressure-sensitive adhesive label papers. The application of a pressure-sensitive adhesive composition to a substrate such as a base tape or sheet has conventionally been carried out by roll-coating or spraying of a solution or dispersion of the adhesive composition in a solvent. However, the use of solvents in the manufacture of pressure-sensitive adhesive products such as pressure-sensitive adhesive tapes inevitably involves the risks of environmental pollution, breaking out of fire, deterioration of factory hygiene and the like, which have grown grave problems of social concern. Accordingly, solvent-free hot-melt pressure-sensitive adhesive compositions have recently attracted attention since they do not involve the above-mentioned risks. However, they are generally so poor in holding power for paper as to present a difficulty in effecting adhesion of packaging corrugated boards.

As a result of our intensive investigations, we have found that a blend of as the base polymer a modified block copolymer comprising at least one polybutadiene or polyisoprene block and at least two polystyrene blocks and grafted with at least one unsaturated carboxylic acid monomer and/or derivative monomer thereof with a specific tackifier mixture can serve as a hot-melt pressure-sensitive adhesive composition which is excellent in holding power especially for paper. We have now completed the present invention based on such a finding.

More specifically, in accordance with the present invention, there is provided a hot-melt pressure-sensitive adhesive composition comprising:

(a) 100 parts by weight of a grafted block copolymer material formed by the graft reaction of at least one block copolymer with at least one unsaturated carboxylic acid monomer and/or derivative monomer thereof in an amount of 0.01 to 30% by weight based on the total of said at least one block copolymer and said at least one monomer, said at least one block copolymer being represented by the following formula:

A—B—A, (A—B)$_n$, B—(A—B)$_n$, (A—B)$_{\overline{n}}$A or (A—B)$_m$X wherein B stands for a block consisting essentially of butadiene or isoprene monomer units, A stands for a block consisting essentially of styrene monomer units, n is an integer of from 2 to 10, X is the residue of a polyfunctional coupling agent to which m of (A—B) are bonded and m is an integer of from 2 to 7, having a melt flow index of 0.1 to 40 g/10 minutes as measured in accordance with ASTM D 1238 (Condition G), and containing 5 to 50% by weight of styrene monomer units; and (b) 50 to 250 parts by weight of a tackifier mixture consisting of a tackifier S and a tackifier L and having an S/L mixing weight ratio of 9/1 to 3/7, said tackifier S being at least one terpene resin having a softening point of 60° C. or more or a mixture of 50% by weight or more of at least one terpene resin having a softening point of 60° C. or more and less than 50% by weight of at least one other resin having a softening point of 60° C. or more and selected from rosin and derivatives thereof, petroleum resins and styrene resins, and said tackifier L being at least one terpene resin having a softening point of 30° C. or less or a mixture of 50° C. by weight or more of at least one terpene resin having a softening point of 30° C. or less and at least one other resin having a softening point of 30° C. or less and selected from rosin derivatives, petroleum resins and styrene resins.

Figure 2:
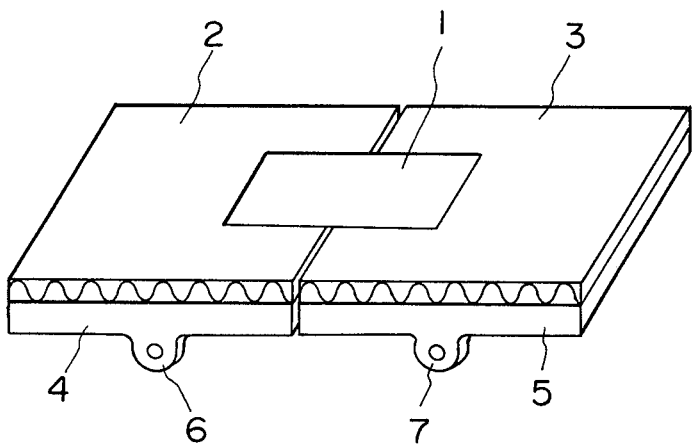
Figure 3:
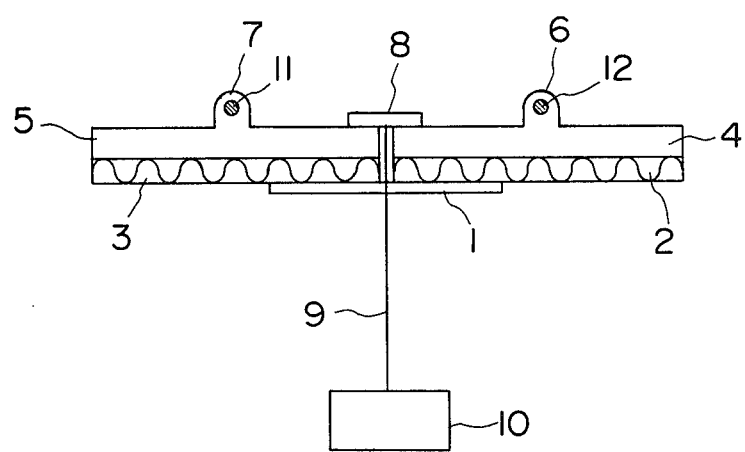

The foregoing and other features and advantages of the present invention will be apparent to those skilled in the art from the following detailed description taken in connection with the accompanying drawings in which:

FIG. 1 is a diagrammatic perspective view showing corrugated boards having, stuck thereon, a pressure-sensitive adhesive tape sample to be subjected to measurement of flap holding power as representing the holding power of the pressure-sensitive adhesive tape for the corrugated boards;

FIG. 2 is a diagrammatic perspective view showing iron flaps having the corrugated boards fixed thereto with an adhesive and having, stuck thereon, the pressure-sensitive adhesive tape sample to be subjected to the measurement of flap holding power; and FIG. 3 is a diagrammatic side view illustrating the measurement of flap holding power of the pressure-sensitive adhesive tape for the corrugated boards.

The block copolymer of the above-mentioned formula that is used for the preparation of the grafted block copolymer material (a) used in the hot-melt pressure-sensitive adhesive composition of the present invention can be prepared, for example, according to the living anionic polymerization method in which an alkali metal-containing organometallic initiator such as sec- or n-butyl lithium is used (see, for example, U.S. Pat. No. 3,265,765). More specifically, the block copolymer is prepared by the alternate polymerization in sequence of each of two different monomers in the presence of the above-mentioned initiator and the subsequent inactivation of the resulting living block copolymer anion radicals with an inactivating agent such as water, phenol or an alcohol, by the polymerization of two monomers differing in monomer reactivity ratio and charged simultaneously into a reactor and the subsequent inactivation of the resulting living block copolymer anion radicals with an inactivating agent such as water, phenol or an alcohol, or by the polymerization in sequence of each of two different monomers in the presence of the above-mentioned initiator and the subsequent coupling of the resulting living block copolymer anion radicals with a polyfunctional coupling agent such as tin dichloride, tin tetrachloride, silicon tetrachloride, trichloromethylsilane or a polyepoxy compound 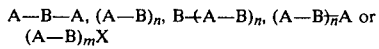.

The block copolymer that is used for the preparation of the grafted block copolymer material (a) used in the hot-melt pressure-sensitive adhesive composition of the present invention has a melt flow index of 0.1 to 40 g/10 minutes, preferably 1 to 20 g/10 minutes, as measured in accordance with ASTM D 1238 (Condition G). If the melt flow index is lower than 0.1 g/10 minutes, the resulting hot-melt pressure-sensitive adhesive composition has too high a melt viscosity to be supplied to a hot-melt applicator. If the melt flow index is higher than 40 g/10 minutes, the resulting hot-melt pressure-sensitive adhesive composition is poor in holding power. The styrene monomer unit content of the block copolymer is in the range of from 5 to 50% by weight, preferably in the range of from 15 to 45% by weight. If the styrene monomer unit content falls outside the range of from 5 to 50% by weight, the resulting hot-melt pressure-sensitive adhesive composition has too poor pressure-sensitive adhesive characteristics to be used in pressure-sensitive adhesive tapes and the like. The block copolymer may be of any one of the five formulae mentioned before, i.e. A—B—A, $(A—B)_n$, $B$-$(A—B)_n$, $(A—B)_{\bar{n}}A$ and $(A—B)_mX$, but is preferably of $(A—B)_mX$ wherein m is preferably an integer of from 3 to 7 since the resulting hot-melt pressure-sensitive adhesive composition is better in holding power than those in the cases of the other four formulae and with the same melt viscosity as that of the above-mentioned composition. It is noted that the melt viscosity has substantially direct relation to the processability of the composition.

The grafted block copolymer material (a) to be used in the hot-melt pressure-sensitive adhesive composition of the present invention is prepared from at least one block copolymer as described above and at least one unsaturated carboxylic acid monomer and/or derivative monomer thereof according to the graft reaction method. As the unsaturated carboxylic acid monomer that may be grafted on the block copolymer, there can be mentioned, for example, maleic acid, fumaric acid, itaconic acid, acrylic acid, methacrylic acid, crotonic acid, cis-4-cyclohexene-1,2-dicarboxylic acid and endo-cis-bicyclo [2,2,1]-5-heptene-2,3-dicarboxylic acid. Examples of the derivative monomer of the above-mentioned unsaturated carboxylic acid monomer include those in the form of acid anhydride, ester, acid amide or acid imide. Dicarboxylic anhydrides are preferred. More preferred is maleic anhydride.

The amount of at least one unsaturated carboxylic acid monomer and/or derivative monomer thereof grafted on at least one block copolymer of the aforementioned formula in forming a grafted block copolymer material (a) to be used in the hot-melt pressure-sensitive adhesive composition of the present invention is in the range of from 0.01 to 30% by weight, preferably in the range of from 0.05 to 10% by weight, and most preferably in the range of from 0.1 to 3% by weight. When the above-mentioned amount is smaller than 0.01% by weight, the effect of grafting for improving pressure-sensitive adhesive characteristics such as holding power in the resulting hot-melt pressure-sensitive adhesive composition is not substantially recognizable. Even if the above-mentioned amount is increased to more than 30% by weight, no substantial increase in the above-mentioned effect is recognizable.

The grafted block copolymer material (a) is prepared by grafting at least one block copolymer of the aforementioned formula with at least one unsaturated carboxylic acid monomer and/or derivative monomer thereof in the presence or absence of a radical reaction initiator while keeping the reaction system in the molten state of the materials or in the dissolved state of the materials in a solvent. Any way of carrying out the graft reaction may be adopted in so far as the resulting grafted block copolymer does not contain lumps of gel or other unfavorable substances and does not have so much reduced melt viscosity owing to some thermal degradation as to be poor in processability. According to one preferred way of carrying out the graft reaction, at least one unsaturated carboxylic acid monomer and/or derivative monomer thereof is reacted with at least one block copolymer of the aforementioned formula in an extruder while keeping the reaction system in the molten state of the materials mixed in the absence of a radical reaction initiator. In the graft reaction, if desired, an antioxidizing agent such as phenothiazine or 2,5-di-tert-butylhydroquinone may be used for minimizing the thermal oxidation of the block copolymer. The grafted block copolymer material (a) thus prepared preferably has a melt flow index of 0.1 to 50 g/10 minutes, more preferably 1 to 25 g/10 minutes, as measured in accordance with ASTM D 1238 (Condition G).

The tackifier mixture (b) to be used in the hot-melt pressure-sensitive adhesive composition of the present invention consists of a tackifier S and a tackifier L described below and having an S/L mixing weight ratio of 9/1 to 3/7. Here, the tackifier S is at least one terpene resin having a softening point of 60° C. or more or a mixture of 50% by weight or more of at least one terpene resin having a softening point of 60° C. or more and less than 50% by weight of at least one other resin having a softening point of 60° C. or more and selected from rosin and derivatives thereof, petroleum resins and styrene resins, and the tackifier L is at least one terpene resin having a softening point of 30° C. or less or a mixture of 50% by weight or more of at least one terpene resin having a softening point of 30° C. or less and at least one other resin having a softening point of 30° C. or less and selected from rosin derivatives, petroleum resins and styrene resins. The measurement of softening point is carried out in accordance with JIS (Japanese Industrial Standard) K 2531 (ring and ball softening point method). At least one terpene resin to be used as or in the tackifier S must have a softening point of 60° C. or more, and must be included in an amount of 50 to 100% by weight in the tackifier S because otherwise the resulting hot-melt pressure-sensitive adhesive composition is poor in holding power. At least one other resin that may be mixed with the terpene resin in the tackifier S must be selected from rosin and derivatives thereof, petroleum resins and styrene resins that have a softening point of 60° C. or more, and must be contained in an amount of less than 50% by weight in the tackifier S because otherwise the resulting hot-melt pressure-sensitive adhesive composition is poor in holding power. At least one terpene resin to be used as or in the tackifier L must have a softening point of 30° C. or less, and must be included in an amount of 50 to 100% by weight in the tackifier L because otherwise the resulting hot-melt pressure-sensitive adhesive composition is poor in initial tack. At least one other resin that may be mixed with the terpene resin in the tackifier L must be selected from rosin derivatives, petroleum resins and styrene resins that have a softening point of 30° C. or less, and must be contained in an amount of less than 50% by weight in the tackifier L because otherwise the resulting hot-melt pressure-sensitive adhesive composition is poor in initial tack. The tackifier S and the tackifier L are used at an S/L mixing weight ratio of 9/1 to 3/7, preferably 8/2 to 5/5. At an S/L mixing weight ratio of more than 9/1, the resulting hot-melt pressure-sensitive adhesive composition is poor in initial tack. At an S/L mixing weight ratio of less than 3/7, the resulting hot-melt pressure-sensitive adhesive composition is poor in holding power.

In the hot-melt pressure-sensitive adhesive composition of the present invention, the tackifier mixture (b) consisting of the tackifier S and the tackifier L is used in an amount of 50 to 250 parts by weight per 100 parts by weight of the grafted block copolymer material (a). If the tackifier mixture (b) is used in an amount falling outside the range specified above, the resulting hot-melt pressure-sensitive adhesive composition is poor in pressure-sensitive adhesive characteristics.

As the terpene resin to be used as or in the tackifier S or the tackifier L, there can be mentioned, for example, homopolymers of α-pinene, β-pinene or dipentene; copolymers of at least two terpene hydrocarbons selected from α-pinene, β-pinene and dipentene; and copolymers of at least one terpene hydrocarbon selected from α-pinene, β-pinene and dipentene with phenol, and/or a $C_5$ fraction and/or a $C_9$ fraction of a naphtha-cracked oil. They may be used either alone or in mixture. Of them, a homopolymer of α-pinene is preferred from the viewpoint of pressure-sensitive adhesive characteristics of the resulting hot-melt pressure-sensitive adhesive composition. Oligomers of at least one terpene hydrocarbons as mentioned above may be used as or in the tackifier L. Rosin and/or at least one derivative thereof having a softening point of 60° C. or more may be used in the tackifier S. Examples of rosin derivatives having a softening point of 60° C. or more include hydrogenated rosin, polymerized rosin, glycerol or pentaerythritol esters of rosin or hydrogenated rosin. Examples of rosin derivatives that may be used in the tackifier L include methyl ester of rosin and hydrogenated methyl ester of rosin. Examples of petroleum resins that may be used in the tackifier S or the tackifier L include homopolymers or hydrogenated homopolymers of dicyclopentadiene, or a $C_5$ fraction or a $C_9$ fraction of a naphtha-cracked oil, and copolymers or hydrogenated copolymers of at least two monomers selected from dicyclopentadiene, and a $C_5$ fraction and a $C_9$ fraction of a naphtha-cracked oil. Examples of styrene resins that may be used in the tackifier S and the tackifier L include a homopolymer of styrene and copolymers of α-methylstyrene and vinyltoluene.

The hot-melt pressure-sensitive adhesive composition of the present invention may further comprise a softening agent (c). The use of a softening agent (c) brings about the reduction of the melt viscosity of the composition, leading to a better processability of the composition. The softening agent (c) may usually be used in an amount of 1 to 50 parts by weight per 100 parts by weight of the grafted block copolymer material (a). When the softening agent is used in too large an amount, the resulting hot-melt pressure-sensitive adhesive composition is poor in holding power though it has a further reduced melt viscosity.

As materials of the softening agent (c) that may be used in the hot-melt pressure-sensitive adhesive composition of the present invention, there can be mentioned, for example, rubber processing oils such as naphthenic oils, aromatic oils and paraffinic oils; plasticizers such as esters of phthalic acid, esters of fumaric acid, adipic acid or sebacic acid, and esters of phosphoric acid; and liquid rubbers such as liquid polybutadiene.

Rubber processing oils and ester type plasticizers are preferred from the viewpoint of melt viscosity and holding power of the resulting hot-melt pressure-sensitive adhesive composition.

At least one ordinary rubber such as natural rubber, polyisoprene rubber, polybutadiene rubber, styrene-butadiene copolymer rubber or styrene-conjugated diene block copolymer rubber, and/or a filler may be added to the hot-melt pressure-sensitive adhesive composition of the present invention in so far as the properties required of the hot-melt pressure-sensitive adhesive composition are not spoiled. If desired, an antioxidizing agent, an ultraviolet absorbing agent, a coloring agent, etc. may be added to the hot-melt pressure-sensitive adhesive composition of the present invention.

The hot-melt pressure-sensitive adhesive composition of the present invention preferably comprises at least 60% by weight, more preferably at least 70% by weight, of the total of the component (a) and (b).

The preparation of the hot-melt pressure-sensitive adhesive composition of the present invention may be carried out using, for example, a melting vessel, a kneader, a mixing roll, an extruder or an internal mixer.

The hot-melt pressure-sensitive adhesive composition of the present invention is excellent in holding power especially for paper and comparable in holding power for other adherend such as a plastic, a metal and a glass with conventional hot-melt pressure-sensitive adhesive compositions, and, hence, can advantageously be used for the manufacture of pressure-sensitive adhesive products such as pressure-sensitive adhesive tapes and labels of versatile utility.

The following Examples illustrate the present invention in more detail but should not be construed as limiting the scope of the invention.

In the following Examples and Comparative Examples, properties mentioned below were measured according to the following methods.

(1) Initial Tack:

This is measured in accordance with JIS Z 0237 (ball rolling method of J. Dow). More specifically, a pressure-sensitive adhesive tape is fixed to a plate inclined at an angle of 30° with the horizon and the ball number of a largest ball capable of stopping on the tacky surface of the pressure-sensitive adhesive tape is determined. The larger the ball number of a largest ball capable of stopping on the tacky surface of the pressure-sensitive adhesive tape, the larger the initial tack. The measurement of the tack is carried out at 20° C.

(2) Flap Holding Power:

A sample 1 of 52 mm in length and 20 mm in width is cut out from a pressure-sensitive adhesive tape. As shown in FIG. 1, two corrugated boards 2 and 3 of 70 mm in length, 50 mm in width and 5 mm in thickness are placed so that the lateral sections of the boards confront each other with a spacing of 2 mm therebetween. The pressure-sensitive adhesive tape sample 1 of 20 mm in width and 52 mm in length is pressed 2 times onto the middle portions of the surfaces of the corrugated boards 2 and 3 (as depicted in FIG. 1) by means of a roller having a weight of 200 g to effect adhesion therebetween. The area of contact of each board with the adhesive tape sample 1 stuck thereon is 20 mm × 25 mm.

As shown in FIG. 2, the corrugated boards 2 and 3 having the sample 1 stuck thereon is fixed to iron flaps 4 and 5 of 70 mm in length and 50 mm in width by using an adhesive. The flaps 4 and 5 each has a bearing 6 or 7 (other pair cannot be seen in FIG. 2) at the center of each of the longitudinal edges.

As shown in FIG. 3, two loads 10 each having a weight of 500 g are hung through the 2 mm spacing in the central portion thereof by using respective rectangular parallelepipeds 8 of 6 mm in length, 4 mm in width and 4 mm in thickness and respective strings 9 not contacted with the sample 1 so that turning moments act on both the flaps 4 and 5 with the centers of shafts 11 and 12 being the centers of said turning moments (each one of the loads 10, the rectangular parallelepipeds 8, the strings 9 and the bearings 6 and 7 is hidden by the other in FIG. 3). The period of time till the loads 10 fall is measured under a temperature of 40° C.

Examples 1 to 12 and Comparative Examples 1 to 11

(1) Preparation of grafted block copolymer A:

1.5 parts by weight of maleic anhydride and 0.2 part by weight of phenothiazine were added to 100 parts by weight of a (polystyrene-polybutadiene)$_4$-silicon block copolymer having a melt flow index of 8 g/10 minutes as measured in accordance with ASTM D 1238 (Condition G) and a styrene monomer unit content of 30% by weight (hereinafter referred to as "non-grafted block copolymer N"), and they were mixed by a mixer to form an intimate mixture.

The mixture was supplied to a 40 mm extruder having a single, full-flighted type screw with a length/diameter ratio of 24, and the maleic acid-graft reaction was carried out at a cylinder temperature of 200° C. After completion of the reaction, the maleic anhydride remaining unreacted was removed under reduced pressure to obtain a grafted block copolymer A having a melt flow index of 5.2 g/10 minutes as measured in accordance with ASTM D 1238 (Condition G), a toluene-insoluble matters content of 0.05% by weight and a maleic anhydride-graft content of 0.70% by weight.

(2) Preparation of grafted block copolymer B:

A grafted block copolymer B having a melt flow index of 6.1 g/10 minutes as measured in accordance with ASTM D 1238 (Condition G), a toluene-insoluble matters content of 0.02% by weight and a maleinimide-graft content of 0.20% by weight was prepared in substantially the same manner as in the preparation of the grafted block copolymer A except that maleinimide was used instead of maleic anhydride.

(3) Preparation of grafted block copolymer C:

A grafted block copolymer C having a melt flow index of 16 g/10 minutes as measured in accordance with ASTM D 1238 (Condition G), a toluene-insoluble matters content of 0.04% by weight and a maleic anhydride-graft content of 2.6% by weight was prepared in substantially the same manner as in the preparation of the grafted block copolymer A except that a (polystyrene-polybutadiene)$_4$-silicon block copolymer having a melt flow index of 18 g/10 minutes as measured in accordance with ASTM D 1238 (Condition G) and a styrene monomer unit content of 40% by weight was used instead of the (polystyrene-polybutadiene)$_4$-silicon block copolymer used in the preparation of the grafted block copolymer A and maleic anhydride was used in an amount of 5 parts by weight instead of 1.5 parts by weight.

(4) Preparation of grafted block copolymer D:

A grafted block copolymer D having a melt flow index of 2.6 g/10 minutes as measured in accordance with ASTM D 1238 (Condition G), a toluene-insoluble matters content of 0% by weight and a maleic anhydride-graft content of 1.6% by weight was prepared in substantially the same manner as in the preparation of the grafted block copolymer A except that a polystyrene-polyisoprene-polystyrene block copolymer having a melt flow index of 2.0 g/10 minutes as measured in accordance with ASTM D 1238 (Condition G) and a styrene monomer unit content of 16% by weight was used instead of the (polystyrene-polybutadiene)$_4$-silicon block copolymer and maleic anhydride was used in an amount of 3 parts by weight instead of 1.5 parts by weight.

(5) Preparation of grafted block copolymer E:

The grafted block copolymer A was subjected to a hot water treatment at 80° C. for 3 hours to prepare a grafted block copolymer E.

(6) Preparation of hot-melt pressure-sensitive adhesive compositions:

Using ingredient shown together with their amounts in terms of parts by weight in Table 1 or 2, each hot-melt pressure-sensitive adhesive composition was prepared by melt-mixing the ingredients for about one hour in a vessel provided with a stirrer and maintained at about 180° C.

(7) Preparation of pressure-sensitive adhesive tape:

Part of each hot-melt pressure-sensitive adhesive composition so obtained was molten and coated at 170° C. at a thickness of about 50μ on a kraft paper (75 g/m$^2$) having a polyethylene layer laminated on the back surface thereof and treated with a silicone.

(8) Measurements of initial tack and flap holding power:

The initial tack and flap holding power of each pressure-sensitive adhesive kraft paper tape obtained were measured to obtain the results as shown in Table 1 or 2.

EXAMPLES 13 to 18

Using ingredients shown together with their amounts in terms of parts by weight in Table 3, hot-melt pressure-sensitive adhesive compositions and pressure-sensitive adhesive tapes therefrom were prepared in substantially the same manner as in Examples 1 to 12 and Comparative Examples 1 to 11.

The melt viscosity of each hot-melt pressure-sensitive adhesive composition as measured at 180° C. by using a Brookfield rotational viscometer is listed together with the initial tack and flap holding power of a pressure-sensitive adhesive tape prepared from the compositions in Table 3.

Some explanation will be given with reference to each of the trade names mentioned in the following Tables 1 to 3 as follows.

YS Resin A1150: trade name of an α-pinene polymer having a softening point of 115° C. and manufactured by Yasuhara Yushi K.K., Japan.

YS Polystar T115: trade name of an α-pinene-phenol copolymer having a softening point of 115° C. and an α-pinene monomer unit content of 74% by weight and manufactured by Yasuhara Yushi K.K., Japan.

YS Resin Z115: trade name of an α-pinene-β-pinene-dipentene-C$_9$ fraction copolymer having a softening point of 115° C. and a C$_9$ fraction monomer unit content of 20% by weight and manufactured by Yasuhara Yushi K.K., Japan.

Ester Gum H: trade name of glycerol ester of partially hydrogenated rosin having a softening point of 68° C. and manufactured by Arakawa Kagaku K.K., Japan.

Arkon M 90: trade name of an alicyclic saturated hydrocarbon resin having a softening point of 90° C. and manufactured by Arakawa Kagaku K.K., Japan.

Escorez 1102: trade name of an aliphatic unsaturated hydrocarbon resin having a softening point of 100° C. and manufactured by Exxon Chemicals Japan Ltd., Japan.

YS Oil D: trade name of an α-pinene-β-pinene-dipentene oligomer having a softening point lower than 20° C. and manufactured by Yasuhara Yushi K.K., Japan.

Hercolyn D: trade name of hydrogenated methyl ester of rosin having a softening point lower than 20° C. and manufactured by Hercules Inc., U.S.A.

Piccolastic A-5: trade name of a styrene oligomer having a softening point lower than 20° C. and sold by Rika Hercules K.K., Japan.

Nocrac NS-7: trade name of 2,5-di-tert-butylhydroquinone manufactured by Ouchi-Shinko Chemical Industrial Co., Ltd., Japan.

Sonic Process Oil R-200: trade name of a naphthenic rubber processing oil manufactured by Nihon Kogyo K.K., Japan.

TABLE 1

| Example No. | 1 | 2 | 3 | 4 | 5 | 6 | 7 | 8 | 9 | 10 | 11 | 12 |
|---|---|---|---|---|---|---|---|---|---|---|---|---|
| grafted block copolymer | | | | | | | | | | | | |
| A | 100 | 100 | 100 | | | | 100 | 100 | 100 | 100 | 100 | |
| B | | | | 100 | | | | | | | | |
| C | | | | | 100 | | | | | | | |
| D | | | | | | 100 | | | | | | |
| E | | | | | | | | | | | | 100 |
| tackifier mixture | | | | | | | | | | | | |
| tackifier S | | | | | | | | | | | | |
| YS Resin A1150 | 100 | 100 | 160 | | | | 70 | 70 | 70 | 120 | 120 | 100 |
| YS Polystar T115 | | | | 50 | 75 | | | | | | | |
| YS Resin Z115 | | | | | | 150 | | | | | | |
| Ester Gum H | | | | | | | 30 | | | | | |
| Arkon M90 | | | | | | | | 30 | | | | |
| Escorez 1102 | | | | | | | | | 30 | | | |
| tackifier L | | | | | | | | | | | | |
| YS Oil D | 60 | 100 | 40 | 30 | 45 | 90 | 60 | 60 | 60 | 40 | 40 | 60 |
| Hercolyn D | | | | | | | | | | 20 | | |
| Piccolastic A-5 | | | | | | | | | | | 20 | |
| Nocrac NS-7 | 3 | 3 | 3 | 3 | 3 | 3 | 3 | 3 | 3 | 3 | 3 | 3 |
| terpene resin content of tackifier S (% by weight) | 100 | 100 | 100 | 100 | 100 | 100 | 70 | 70 | 70 | 100 | 100 | 100 |
| terpene resin content of tackifier L (% by weight) | 100 | 100 | 100 | 100 | 100 | 100 | 100 | 100 | 100 | 66.7 | 66.7 | 100 |
| S/L mixing weight ratio | 6.25/3.75 | 5/5 | 8/2 | 6.25/3.75 | 6.25/3.75 | 6.25/3.75 | 6.25/3.75 | 6.25/3.75 | 6.25/3.75 | 6.67/3.33 | 6.67/3.33 | 6.25/3.75 |
| amount of tackifier mixture (S + L) | 160 | 200 | 200 | 80 | 120 | 240 | 160 | 160 | 160 | 180 | 180 | 160 |
| initial tack (ball number) | 17 | 26 | 16 | 16 | 18 | 22 | 23 | 16 | 20 | 18 | 17 | 16 |
| flap holding power (minutes) | >120 | 96 | >120 | 52 | 75 | 49 | 58 | 70 | 63 | 63 | 56 | >120 |

TABLE 2

| Comparative Example No. | 1 | 2 | 3 | 4 | 5 | 6 | 7 | 8 | 9 | 10 | 11 |
|---|---|---|---|---|---|---|---|---|---|---|---|
| grafted block copolymer A | 100 | 100 | 100 | 100 | 100 | 100 | 100 | 100 | 100 | | |
| non-grafted block copolymer N | | | | | | | | | | 100 | 100 |
| tackifier mixture | | | | | | | | | | | |
| tackifier S | | | | | | | | | | | |
| YS Resin A1150 | 100 | 20 | 12.5 | 200 | 30 | 30 | 30 | 100 | 100 | 100 | 100 |
| YS Polystar T115 | | | | | | | | | | | |
| YS Resin Z115 | | | | | | | | | | | |
| Ester Gum H | | | | | 70 | | | | | | |
| Arkon M90 | | | | | | 70 | | | | | |
| Escorez 1102 | | | | | | | 70 | | | | |
| tackifier L | | | | | | | | | | | |
| YS Oil D | | 80 | 7.5 | 120 | 60 | 60 | 60 | 20 | 20 | 60 | 100 |
| Hercolyn D | | | | | | | | 40 | | | |
| Piccolastic A-5 | | | | | | | | | 40 | | |
| Nocrac NS-7 | 3 | 3 | 3 | 3 | 3 | 3 | 3 | 3 | 3 | 3 | 3 |
| terpene resin content of tackifier S (% by weight) | 100 | 100 | 100 | 100 | 30 | 30 | 30 | 100 | 100 | 100 | 100 |
| terpene resin content of tackifier L (% by weight) | — | 100 | 100 | 100 | 100 | 100 | 100 | 33.3 | 33.3 | 100 | 100 |
| S/L mixing weight ratio | 10/0 | 2/8 | 6.25/3.75 | 6.25/3.75 | 6.25/3.75 | 6.25/3.75 | 6.25/3.75 | 6.25/3.75 | 6.25/3.75 | 6.25/3.75 | 5/5 |
| amount of tackifier mixture (S + L) | 100 | 100 | 20 | 320 | 160 | 160 | 160 | 160 | 160 | 160 | 200 |
| initial tack (ball number) | <5 | 22 | <5 | 12 | 19 | 12 | 15 | 9 | 9 | 20 | 22 |
| flap holding power (minutes) | 1 | <1 | <1 | <1 | 5 | 8 | 7 | 23 | 18 | 15 | 12 |

TABLE 3

| Example No. | 13 | 14 | 15 | 16 | 17 | 18 |
|---|---|---|---|---|---|---|
| grafted block copolymer A | 100 | 100 | 100 | 100 | 100 | 100 |
| tackifier mixture | | | | | | |
| tackifier S (YS Resin A 1150) | 120 | 120 | 120 | 120 | 120 | 120 |
| tackifier L (YS Oil D) | 40 | 45 | 45 | 40 | 45 | 45 |
| Sonic Process Oil R-22 | | | 15 | 35 | | |
| dioctyl fumarate | | | | | 15 | |
| trioctyl phosphate | | | | | | 15 |
| Nocrac NS-7 | 3 | 3 | 3 | 3 | 3 | 3 |
| terpene resin content of tackifier S (% by weight) | 100 | 100 | 100 | 100 | 100 | 100 |
| terpene resin content of tackifier L (% by weight) | 100 | 100 | 100 | 100 | 100 | 100 |
| S/L mixing weight ratio | 7.5/2.5 | 7.27/2.73 | 7.27/2.73 | 7.5/2.5 | 7.27/2.73 | 7.27/2.73 |
| amount of tackifier mixture (S + L) | 160 | 165 | 165 | 160 | 165 | 165 |
| initial tack (ball number) | 16 | 17 | 21 | 17 | 24 | 26 |
| flap holding power (minutes) | >120 | >120 | 68 | 38 | 83 | 61 |
| melt viscosity (cps) | 21,000 | 20,000 | 14,000 | 6,800 | 11,000 | 12,000 |

What is claimed is:

1. A hot-melt pressure-sensitive adhesive composition comprising:
   (a) 100 parts by weight of a grafted block copolymer material formed by the graft reaction of at least one block copolymer with at least one unsaturated carboxylic acid monomer and/or derivative monomer thereof in an amount of 0.01 to 30% by weight based on the total of said at least one block copolymer and said at least one monomer, said at least one block copolymer being represented by the following formula:

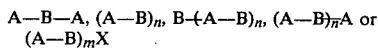

A—B—A, (A—B)$_n$, B—(A—B)$_n$, (A—B)$_{\overline{n}}$A or (A—B)$_m$X wherein B stands for a block consisting essentially of butadiene or isoprene monomer units, A stands for a block consisting essentially of styrene monomer units, n is an integer of from 2 to 10, X is the residue of a polyfunctional coupling agent to which m of (A—B) are bonded and m is an integer of from 2 to 7,
   having a melt flow index of 0.1 to 40 g/10 minutes as measured in accordance with ASTM D 1238 (Condition G), and containing 5 to 50% by weight of styrene monomer units; and
   (b) 50 to 250 parts by weight of a tackifier mixture consisting of a tackifier S and a tackifier L and having an S/L mixing weight ratio of 9/1 to 3/7, said tackifier S being at least one terpene resin having a softening point of 60° C. or more or a mixture of 50% by weight or more of at least one terpene resin having a softening point of 60° C. or more and less than 50% by weight of at least one other resin having a softening point of 60° C. or more and selected from rosin and derivatives thereof, petroleum resins and styrene resins, and said tackifier L being at least one terpene resin having a softening point of 30° C. or less or a mixture of 50% by weight or more of at least one terpene resin having a softening point of 30° C. or less and at least one other resin having a softening point of 30° C. or less and selected from rosin derivatives, petroleum resins and styrene resins.

2. A hot-melt pressure-sensitive adhesive composition as claimed in claim 1, wherein said tackifier S comprises a homopolymer of α-pinene as said at least one terpene resin.

3. A hot-melt pressure-sensitive adhesive composition as claimed in claim 1 or 2 wherein said S/L mixing weight ratio is in the range of from 8/2 to 5/5.

4. A hot-melt pressure sensitive adhesive composition as claimed in claim 1, wherein the styrene monomer unit content of said at least one block copolymer is in the range of from 15 to 45% by weight.

5. A hot-melt pressure-sensitive adhesive composition as claimed in claim 1, wherein the melt flow index of said at least one block copolymer is in the range of from 1 to 20 g/10 minutes as measured in accordance with ASTM D 1238 (Condition G).

6. A hot-melt pressure-sensitive adhesive composition as claimed in claim 1, wherein said at least one unsaturated carboxylic acid monomer and/or derivative monomer thereof is maleic anhydride.

7. A hot-melt pressure-sensitive adhesive composition as claimed in claim 1 or 6, wherein the amount of said at least one unsaturated carboxylic acid monomer and/or derivative monomer thereof grafted on said at least one block copolymer is in the range of from 0.1 to 3% by weight based on the total of said at least one block copolymer and said at least one monomer.

8. A hot-melt pressure-sensitive adhesive composition as claimed in claim 1, which further comprises (c) 1 to 50 parts by weight of a softening agent.

9. A hot-melt pressure-sensitive adhesive composition as claimed in claim 8, wherein said softening agent is at least one member selected from the group consisting of rubber processing oils and ester type plasticizers.

10. A hot-melt pressure-sensitive adhesive composition as claimed in claim 8 or 9, wherein said tackifier S comprises a homopolymer of α-pinene as said at least one terpene resin.

11. A hot-melt pressure-sensitive adhesive composition as claimed in claim 8 or 9, wherein said S/L mixing weight ratio is in the range of from 8/2 to 5/5.

12. A hot-melt pressure-sensitive adhesive composition as claimed in claim 8 or 9, wherein the styrene monomer unit content of said at least one block copolymer is in the range of from 15 to 45% by weight.

13. A hot-melt pressure-sensitive adhesive composition as claimed in claim 8 or 9, wherein the melt flow index of said at least one block copolymer is in the range of from 1 to 20 g/10 minutes as measured in accordance with ASTM D 1238 (Condition G).

14. A hot-melt pressure-sensitive adhesive composition as claimed in claim 8 or 9, wherein said at least one unsaturated carboxylic acid monomer and/or derivative monomer thereof is maleic anhydride.

15. A hot-melt pressure-sensitive adhesive composition as claimed in claim 8 or 9, wherein the amount of said at least one unsaturated carboxylic acid monomer and/or derivative monomer thereof grafted on said at least one block copolymer is in the range of from 0.1 to 3% by weight based on the total of said at least one block copolymer and said at least one monomer.

* * * * *